(12) United States Patent
Park et al.

(10) Patent No.: US 6,603,735 B1
(45) Date of Patent: Aug. 5, 2003

(54) PN SEQUENCE IDENTIFYING DEVICE IN CDMA COMMUNICATION SYSTEM

(75) Inventors: Su-Won Park, Seoul (KR); Hyun-Kyu Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/386,062

(22) Filed: Aug. 30, 1999

(30) Foreign Application Priority Data

Aug. 29, 1998 (KR) ........................................ 1998-35797

(51) Int. Cl.$^7$ ................................................ H04J 11/00
(52) U.S. Cl. ...................................... 370/208; 370/335
(58) Field of Search ................................. 370/209, 335, 370/342, 441, 204, 205, 206, 207, 208, 210, 211; 375/130, 140, 146, 147, 149

(56) References Cited

U.S. PATENT DOCUMENTS

| | | | | |
|---|---|---|---|---|
| 5,748,669 A | * | 5/1998 | Yada | |
| 5,883,899 A | * | 3/1999 | Dahlman | |
| 5,896,368 A | * | 4/1999 | Dahlman | |
| 5,982,810 A | * | 11/1999 | Nishimori | |
| 5,983,113 A | * | 11/1999 | Asanuma | |
| 6,018,667 A | * | 1/2000 | Ghosh | |
| 6,084,884 A | * | 7/2000 | Adachi | |
| 6,091,761 A | * | 7/2000 | Popovic | |
| 6,201,800 B1 | * | 3/2001 | Tsubouchi | |
| 6,226,315 B1 | * | 5/2001 | Sriram | |
| 6,246,673 B1 | * | 6/2001 | Tiedemann | |
| 6,317,422 B1 | * | 11/2001 | Khaleghi | |
| 6,333,925 B1 | * | 12/2001 | Tsubouchi | |

* cited by examiner

*Primary Examiner*—Kwang Bin Yao
*Assistant Examiner*—Kamran Emdadi
(74) *Attorney, Agent, or Firm*—Dilworth & Barrese, LLP

(57) ABSTRACT

A PN sequence identifying device in a receiver in an asynchronous CDMA communication system. The receiver receives first OGCs on a primary sync channel and second OGCs on a secondary sync channel synchronized with the primary sync channel symbol by symbol. In the PN sequence identifying device, a first OGC detector detects the first OGCs and obtains a first symbol energy. A first synchronizer receives the first symbol energy, synchronizes chips, symbols, and slots, and outputs a first sync signal. A second OGC detector, upon reception of the first sync signal, detects the second OGCs each time the first sync signal is received, and obtains second symbol energies in base station identifying group units. A hopping pattern generator compares the first symbol energy with the second symbol energies, determines whether null signs are in the second OGCs, determines the order of the null signs if the null signs are present, and generates a hopping pattern of the second OGCs. A second synchronizer synchronizes frames based on the hopping pattern and outputs a second sync signal. A PN sequence generator receives the first and second signals and the hopping pattern and generates a PN sequence.

10 Claims, 16 Drawing Sheets

PN SEQUENCE IDENTIFYING DEVICE IN CDMA COMMUNICATION SYSTEM

PRIORITY

This application claims priority to an application entitled "PN Sequence Identifying Device in CDMA Communication System" filed in the Korean Industrial Property Office on Aug. 29, 1998 and assigned Serial No. 98-35797, the contents of which are hereby incorporated by reference.

BACKGROUND OF THE INVENTION

1. Field of the Invention

The present invention relates generally to a spread spectrum device in an asynchronous CDMA (Code Division Multiple Access) communication system, and in particular, to a device for identifying a PN sequence by assigning a null sign to a part of orthogonal codes used in the generation and identification of a hopping pattern.

2. Description of the Related Art

In a CDMA communication system, orthogonal codes provide channelization, and scrambling codes scramble data and improve spectral characteristics. In general, the scrambling codes are called a PN (Pseudorandom Noise) sequence. In CDMA systems, pseudorandom noise (PN) sequences spread the bandwidth of the modulated signal to a larger transmission bandwidth, and serve to distinguish among the different user signals by using the same transmission bandwidth in a multiple access scheme. M-sequence codes or Gold sequences codes are commonly used as a scrambling (PN) code.

FIG. 1A illustrates PN sequences used by base stations within a plurality of cells in a typical CDMA communication system, and FIG. 1B illustrates an example of a PN sequence generator for generating the PN sequences. FIG. 1A shows seven (7) base stations, and each base station uses a different PN sequence to be distinguished from other base stations.

There are two methods of assigning the PN sequences to the base stations. In one method, the same PN sequence is assigned to all the base stations and a different sequence phase is given to each base station at a specific absolute time in the state where all the base stations use the same carrier and are synchronized by a reference time signal. In this case, the base stations have different PN sequence offsets. Specifically, a base station adds an in-phase signal spread by the same PN sequence with a quadrature-phase signal spread by a PN sequence having a different offset, for transmission. A corresponding addressed mobile station identifies the base station by the quadrature offset.

In the second method, different PN sequences are assigned to adjacent base stations which use the same carrier.

In accordance with the first base station identifying method, only one pair of PN sequences exists. Each base station has the same PN sequence pair and a unique pre-assigned corresponding PN offset. Each base station transmits an in-phase signal spread by the PN sequence and a quadrature-phase signal spread by a PN sequence delayed by the pre-assigned offset to a mobile station, to allow the mobile station to identify the base station. The PN sequence offsets for the base stations, illustrated at FIG. 1, BS#A to BS#G are listed in Table 1.

TABLE 1

| base station | PN sequence | offset value | remark |
|---|---|---|---|
| BS#A | PN_I, PN_Q | A | each base station uses the same PN sequence and generates a PN sequence according to its corresponding offset at the same time point. |
| BS#B | PN_I, PN_Q | B | |
| BS#C | PN_I, PN_Q | C | |
| BS#D | PN_I, PN_Q | D | |
| BS#E | PN_I, PN_Q | E | |
| BS#F | PN_I, PN_Q | F | |
| BS#G | PN_I, PN_Q | G | |

In a conventional IS-95 system where the base stations are synchronized, an extended PN sequence of length $2^{15}$ (=32768=64×512) evolved from a PN sequence of length $2^{15-1}$, in which 0s occur 14 (15—, 1) times and one more zero (0) is inserted, in order to distinguish a base station. Base stations can be identified by assigning them one of 512 starting points (offset #0 to offset #511) resulting from dividing the length 32768 by 64 chip units. Therefore, in operating the base stations as shown in FIG. 1A, {A, B, C, D, E, F, G} ⊂ {0, 1, 2, ..., 511} and #{A, B, C, D, E, F, G}=7. A base station BS#1 outputs an extended PN sequence 64-chip-offset from an extended PN sequence of a base station BS#0 and, base station BS#2 outputs an extended PN sequence (2×64)-chip-offset from the extended PN sequence of base station BS#0, as shown in Table 2.

TABLE 2

| base station | PN offset with t=0 |
|---|---|
| BS #0 | 0 |
| BS #1 | 64 chips |
| BS #2 | 2×64 chips |
| . | . |
| . | . |
| . | . |
| BS #(p−1) | (p−1)×64 chips |
| BS #p | p×64 chips |
| . | . |
| . | . |
| BS #510 | 510×64 chips |
| BS #511 | 511×64 chips |

In the above method, since base stations transmit signals at the same time using timing information received from reference time source such as a GPS (Global Positioning System) satellite, it is possible to distinguish the base stations by the use of a pair of I and Q channel PN sequences having different offsets. That is, the conventional system can distinguish each base station since each base station uses the same PN sequence and spectrum-spreads a transmission signal using the same PN sequence with a corresponding offset value at the same time.

FIG. 1B illustrates an example of a PN sequence generator according to the prior art. The PN sequence generator is a $2^{18-1}$ length Gold sequence generator. It is used with a frame length of 10 msec which is a reduced frame length as compared with a conventional system. The chip rate is 4.096 Mcps corresponding to 40,960 chips per frame. The PN sequence generator generates a different PN sequence for each base station using an initial value corresponding to the number of the base station.

In the conventional method, since base stations transmit signals at the same time using timing information received from a reference time source such as the GPS satellite, it is possible to distinguish the base stations by the use of pairs of spread I and Q channel PN sequences having different offsets. However, if a base station is located within a building or in the subway and cannot receive a signal directly from the GPS satellite, a synchronous CDMA communication system receives a GPS signal in a receivable area and transmits the GPS signal to the base station via a wire link. Due to a delay involved receiving the GPS signal in via wire link, the base station lags behind the reference time of other base stations. Therefore, the base station performs a spreading operation for base station identification based on an incorrect (i.e., delayed) reference time and thus the base station cannot be identified using the reference time information. In addition, because the GPS satellite operates for military purposes, intentional misoperation or fatal damage will cause failures in a communication network.

Therefore, a CDMA system where base stations are asynchronous have been proposed in order to circumvent the problems inherent in a CDMA system where base stations are synchronized as described above in a conventional IS-95 system. However, asynchronous base stations cannot be distinguished only with pairs of spread PN sequence offsets as is true of synchronous systems. That is, it is impossible to distinguish base stations using auto-correlation in an asynchronous system. This is because there is a probability of contention between signals transmitted from two base stations since the base stations are not time-aligned and as a result, it cannot be determined at what time the two adjacent base station transmit. Even though the probability of a mobile station receiving a signal resulting from contention between the outputs of the two base stations is very low, the low probability can have a significant detrimental influence.

Therefore, an asynchronous CDMA communication system should be configured in such a way to overcome the aforestated problem. That is, a mobile station should identify a base station using cross-correlation by analyzing a spread spectrum signal received from an adjacent base station. In this method, all candidate PN sequences should be checked one by one to search for a corresponding base station when a mobile station is turned on or measures the signal strength of the adjacent base station during a call to implement handoff. Therefore, since possible contention periods increase in proportion to the number of PN sequences in the asynchronous system under the same conditions as compared to the synchronous system, it takes a long time to search for a base station which can provide a service. Accordingly, if the asynchronous system can readily determine the PN sequence corresponding to the base station transmitting within a corresponding cell, the time required for acquiring a code can be short.

It is well known that code acquisition is a process of reducing the difference between the sequence phase of a received signal and a phase sequence autonomously generated in a receiver to or below a half chip. The present invention is directed to both PN sequence identification and initial sequence synchronization acquisition.

Since there is no absolute time in each base station in an asynchronous CDMA mobile communication system, a mobile station should first detect the type of sequence corresponding to each cell. The mobile station should pass through an initial sequence acquisition procedure in which the phase difference between the starting point of the used spread sequence and the starting point of the original spread sequence is half a chip or less. The acquired sequence maintains a sequence phase difference at or below the half chip by a synchronization tracking procedure. The time required for detecting the type of a sequence is very long, and many methods have been suggested to detect the type of the same spread sequence of an asynchronous cell.

Base station identifying methods for an asynchronous CDMA communication system include implementations by NTT, DoCoMo, Ericsson, TI (Texas Instruments). Among them, the TI scheme exhibits the best performance and will therefore be described in greater detail below. In each scheme, a mobile station uses a parallel correlator for rapid sequence acquisition and to detect a PN sequence type, that is, a PN sequence group. The parallel correlator is a cross-correlator whose quantity should equal the number of PN sequence groups.

Cells are searched in accordance with the following three steps in the conventional TI implementation:

Step 1: time slot synchronization is acquired.

Step 2: frame synchronization is acquired and the group to which a PN sequence belongs is identified.

Step 3: synchronization for the PN sequence is acquired.

In step 1, a receiver acquires time slot synchronization, symbol synchronization, and chip synchronization. In step 2, frame synchronization is acquired using comma free codes having 17 elements and the group to which a PN sequence belongs is identified by noncoherent demodulation. The receiver obtains the correlation value of each PN sequence within the identified PN sequence group using a corresponding correlator, compares obtained correlation values, and considers that the PN sequence having the highest probability is the PN sequence used by the base station which covers the current mobile station.

FIG. 2A is a block diagram of a base station transmitter in a mobile communication system employing a typical TI implementation:

Forward channels in an asynchronous CDMA communication system include a primary sync channel (PRIMARY SCH), a secondary sync channel (SECONDARY SCH), a common physical channel (CPCH), and a dedicated physical channel (DPCH). CPCHs are divided into a primary CPCH and a secondary CPCH. The primary CPCH is a broadcast channel and the secondary CPCH is a common channel activated as required like a paging channel.

Reference numeral 200 denotes an orthogonal Gold code OGC #0 generator (hereinafter, referred to as a first OGC generator) for a primary sync channel. The output of the OGC #0 generator 200 is as long as one symbol of the primary CPCH and mutually orthogonal to an OGC of the secondary sync channel. The primary sync channel and the secondary sync channel are located in the same position of each slot. All base stations use the OGC #0 for the primary sync channel. The primary sync channel indicates the location of the secondary sync channel in each slot. A mobile station detects the primary sync channel using a matched filter and performs symbol synchronization, slot synchronization, and chip synchronization. An amplifier 210 amplifies the transmission power of the primary sync channel to an intended level. An OGC generating unit 220 for the secondary sync channel (referred to as the second OGC generator 220) has information about a predetermined hopping pattern and generates the corresponding OGC in each slot according to the hopping pattern information. The second OGC generating unit 220 generates OGCs of the group of PN sequences used in a corresponding base station according to a hopping pattern of 16 OGCs in each slot of a frame as shown in FIG. 2C. The second OGC generating unit 220 is comprised of a plurality of second OGC generators 221 to 224, a selector 228, and a controller 226. The second OGC generator 221 generates the first OGC #1 among S OGCs used for the hopping pattern. The second OGC generator 222 generates the second OGC, OGC #2, of the S OGCs used for the hopping pattern. As shown in FIG.

2A, OGC generator 223 generates the (S−1)th OGC OGC #(S−1) among the S OGCs used for the hopping pattern. OGC generator 224 generates the Sth OGC, OGC #S, among the S OGCs used for the hopping pattern. The selector 228 selectively outputs a specific one of the second OGCs under some control. The controller 226 controls the selector 228 according to the comma free code-based hopping. The comma free code-based hopping pattern represents the sequence of second OGCs which are generated for identification of a base station. The comma free code-based hopping patterns are mutually orthogonal. In FIG. 2C, each group is a comma free code-based hopping pattern.

The second OGC generating unit 220 may be a memory for outputting stored values under the control of the controller 226. A plurality of OGCs can be generated, for example, by loading different initial values in one OGC generator according to a hopping pattern under the control of the controller 226. A receiving side decodes and determines which comma free code was used to generate the OGC hopping pattern for the secondary sync channel, to thereby perform frame synchronization and identify the group to which a PN sequence belongs. An amplifier 232 amplifies the transmission power of the secondary sync channel received from the second OGC generating unit 220 to an intended level. Switches 214 and 234 are closed during the periods when the primary and secondary sync channels are present in each slot and otherwise opened. An adder 212 adds the first and second sync channels. A demultiplexer 240 separates channel-encoded and interleaved CPCH data into I channel and Q channel data. Mixers 242 and 243 multiply the output of the demultiplexer 240 by orthogonal codes which provide channelization among forward channels. Amplifiers 244 and 247 amplify the CPCH to an intended value. A demultiplexer 260 separates channel-encoded and interleaved DPCH into I channel and Q channel data. Mixers 262 and 263 multiply the output of the demultiplexer 260 by orthogonal codes which provide channelization among forward channels. Amplifiers 264 and 265 amplify the CPCH data to an intended level. Amplifiers 210, 232, 244, 245, 264, and 265 amplify the transmission powers of the channels to keep relative transmission powers of the channels equal. Adders 246 and 247 add the I channel signals and the Q channel signals of the forward common channel and the forward dedicated control channel. A complex spreader 270 complex-multiplies the outputs of the adders 246 and 247 by the output of a PN sequence generator 268, for complex spreading. The PN sequence generator 268 may include a first PN sequence PN_I generator 266 and a second PN sequence PN_Q generator 267. An example of the PN sequence generator is shown in FIG. 1B.

Adders 280 and 281 add the primary and secondary sync channel signals received from the adder 212 to the output of the complex spreader 270. Filters 282 and 283 low-pass-filters the outputs of the adders 280 and 281. Amplifiers 284 and 285 amplify the outputs of the filters 282 and 283 to the level of actual transmission power. A 90° phase shifter 292 outputs a carrier $\sin(2\pi f_c t)$ which will be multiplied by the Q channel from the input of the carrier $\cos(2\pi f_c t)$ which will be multiplied by the I channel. Mixers 286 and 287 multiply the outputs of the amplifiers 284 and 285 by the carriers and upconvert the frequency of the amplified signals. An adder 290 adds the outputs of the mixers 286 and 287 and transmits the added signal through an antenna.

FIG. 2B illustrates an example of a signal transmitted from the base station transmitter of FIG. 2A.

In FIG. 2B, the chip rate is 4.096 Mcps and a frame length is 10 msec. Therefore, the period of a PN sequence is 40,960 chips (=4.096 Mcps×10 msec), as shown in FIG. 2B. A superframe generally includes 72 frames and each frame has 16 time slots. Therefore, the length of a slot is 0.625 msec.

In FIG. 2B, OGC #0 (hereinafter, referred to as first OGC), which is used in common by all base stations, exists on the primary sync channel in one symbol of each slot of the primary CPCH at 16 Ksps. The secondary sync channel, whose hopping pattern of OGCs within a frame is different for each PN sequence group, is present in the same period as the primary sync channel. The first OGC and an OGC for the secondary sync channel (hereinafter, referred to as a second OGC) are located in the same position of each slot. The first and second OGCs are orthogonal. However, in the sync channel period, the sync channels are not orthogonal to the CPCH and the DPCH. In the sync channel period, there may be no CPCH symbols to be transmitted, and transmission symbols may be present on other CPCHs and the DPCH, as shown in FIG. 2B. Because the primary and secondary sync channels increase the transmission power for the sync channel period relative to that of other periods in the slot, it is preferable not to transmit the primary CPCH in this period.

FIG. 2C illustrates the second OGCs transmitted in each slot of a frame on the secondary sync channel. If the number of second OGC generators in the block 220 is 16 in FIG. 2A, a different OGC hopping pattern is assigned to each group, as shown in FIG. 2C. The same OGC can occur a plurality of times in a hopping pattern, which is generated with comma free codes. If there are 512 PN sequences for base station identification and the number of PN sequence groups is 32, 16 PN sequences form one group, like the IS-95 system as stated above.

FIG. 3A is a block diagram of a mobile station receiver corresponding to the base station transmitter of FIG. 2A. Referring to FIG. 3A, the structure of a forward receiver in an asynchronous CDMA communication system employing the TI scheme will be ti described.

For the input of a carrier $\cos(2\pi f_c t)$, a 90° phase shifter 304 outputs a carrier $\sin(2\pi f_c t)$ by phase shift. An input signal is separated into an I signal and a Q signal by a demultiplexer (not shown). A mixer 300 multiplies the I signal by the carrier $\cos(2\pi f_c t)$ and outputs an I baseband signal. A mixer 301 multiplies the Q signal by the carrier $\sin(2\pi f_c t)$ and outputs a Q baseband signal. Filters 302 and 303 output only the signal in the necessary band from the outputs of the mixers 300 and 301. A matched filter 330 detects the first OGC from the outputs of the filters 302 and 303. A squarer 332 squares the output of the matched filter 330.

A chip/symbol/slot synchronizer 334 determines whether the primary sync channel is present in each slot of the output of the squarer 332. The determination is made by comparing the symbol energies received from the matched filter 330 and the squarer 332 with a reference energy. The reference energy is the symbol energy of the OGC#0 known to the receiver. In the presence of the primary sync channel, that is, upon detection of the first OGC, the chip/symbol/slot synchronizer 334 calculates a correlation value between the first OGC and the second OGC #0 and synchronizes slots when the correlation value is a maximum value. Since the primary sync channel is in one symbol in the case of a symbol rate of 16 ksps, symbols are synchronized using it. Further, the chip/symbol/slot synchronizer 334 acquires rough chip synchronization because the first OGC #0 has a peak value in a matched filter.

FIGS. 3B, 3C, and 3D illustrate signals input to the matched filter 330 without consideration of multipath components and interference components of adjacent base stations.

A peak value detected by the matched filter is located at a vertex of a triangle, and the location of the peak value is the starting point of each slot. A correlation detecting unit 340 operates under the control of the chip/symbol/slot synchronizer 334. The correlation detecting unit 340 is comprised of a plurality of correlators 342, 344, and 346. The correlators 342, 344, and 346 receive the outputs of the filters 302 and 303 and detect correlation values. In the case where all available S OGCs are to be detected in parallel, the number of the correlators, starting from the first correlator labeled zero (#0), is N=(S−1). As described before, the number S of the second OGCs is 17 and the number N of correlators is 16 (meaning there are 17 correlators). If N<(S−1), a searcher operates both in parallel and in series. If all possible cases are searched in parallel, it can be said that correlation values obtained at the same time have experienced the same fading and the same channel environment. However, if a serial search is also performed, the channel environment in the current search cannot be said to be identical to that in the next search. Therefore, it is difficult to obtain accurate search results unless an input signal is stored in a mobile station and searched, resulting in the increase of errors in decoding comma free codes later.

There will hereinbelow be given a description of the operation of the correlation detecting unit 340 for an exemplary case where S=17 and N=16 (i.e., 17, labeled #1 through #17, second OGCs and 17, labeled #0 through #16, correlators). A first correlator #0 342 calculates a correlation value with an input signal using the first OGC #1 of the 17 second OGCs. Second correlator #1 344 calculates a correlation value with the input signal using the second OGC #2 of the 17 second OGCs. An Nth correlator #16 346 calculates a correlation value with the input signal using the 17th OGC #17 of the 17 second OGCs.

Upon reception of the outputs of the correlators 342, 344, and 346, each of squarers 352, 354, and 356 obtains symbol energy from the provided correlation values. A maximum value detector 350 detects the maximum symbol energy from among each of the symbol energies received from the squarers 352, 354, and 356, stores the numbers of the correlators in the order of detection, and generates long code indexes according to the stored numbers. The maximum value detector 350 operates until 16 maximum symbol energies are detected.

A comma free code table 362 stores comma free codes as shown in FIG. 2C. A comma free code decoder 360 decodes using the correlator numbers, the maximum energy values, and the comma free code table and determines a hopping pattern and the PN sequence group having the highest probability. While the long code index output from the maximum value detector 350 has the second OGCs of a corresponding comma free code-based hopping pattern, time points may be different and incorrect second OGCs can be detected due to errors caused by the nature of a radio channel environment. Therefore, the comma free code decoder 360 receives the long code index, determines a comma free code-based hopping pattern with the highest probability referring to the comma free code table, and considers that hopping pattern to be the actual comma free code-based hopping pattern. A first switch 366 is connected between the maximum value detector 350 and the comma free code decoder 360, for switching the output of the maximum value detector 350 to the comma free code decoder 360 by receiving a predetermined signal. The first switch 366 is on when the maximum value detector 350 detects the 16 maximum values.

A frame synchronizer 364 receives the determined hopping pattern information, synchronizes frames, and outputs a frame sync signal indicating frame synchronization. The frame sync signal is applied to the input of a correlation detecting unit 340, the first switch 366, a second switch 368, and a PN sequence generator 312.

Specifically, the frame synchronizer 364 synchronizes based on the comma free code-based hopping pattern information received from the comma free code decoder 360. The frame synchronizer 364 outputs the frame sync signal to the correlation detecting unit 340, thereby stopping its operation. The frame synchronizer 364 also outputs the frame sync signal to turn switch 366 off and then obtains a correlation value for a PN sequence in the group identified based on the hopping pattern, in parallel or in series. If N=16, the frame synchronizer 364 obtains correlation values of 17 candidate PN sequences using 17 correlators. The maximum value detector 350 identifies a PN sequence used in the corresponding base station based on the size of the correlation values if a verification procedure is performed. A long code index produced by switching the identified PN sequence from the second switch 368 to the comma free code decoder 360 is applied to the input of the PN sequence generator 312. The second switch 368 outputs the long code index detected by the correlation value detector 350 to the PN sequence generator 312 before the frame synchronization upon the frame synchronization, the second switch 368 outputs the hopping pattern information received from the comma free code decoder 360 to the PN sequence generator 312.

The PN sequence generator 312 operates upon reception of the chip/symbol/slot sync signal and the frame sync signal, and generates a PN code by the long code index. The PN sequence generator 312 includes a PN_I generator 314 and a PN_Q generator 316. A complex despreader 310 complex-multiplies the signals received from the filters 302 and 303 by the PN code received from the PN sequence generator 312, for complex despreading. The despread signal is output to the baseband processor 320. The output of the complex despreader 310 is deinterleaved and channel-decoded by the baseband processor 320 and recovered to original data transmitted from the base station.

FIGS. 3B, 3C, and 3D illustrate intended received signals of OGC hopping patterns generated by comma free codes for identifying the PN sequence groups #1, #2, and #21 shown in FIG. 2C, respectively.

As described above, a mobile station in the conventional asynchronous CDMA communication system uses correlators equal to the number of OGCs of the group to which a PN sequence used in a base station belongs in order to identify the PN sequence group. As a result, hardware becomes complex.

Moreover, orthogonality is lost in a period when the primary and secondary sync channels are simultaneously transmitted from the base station. Hence, the symbols of a CPCH and DPCH in the sync channel period experience more severe interference than other symbols.

SUMMARY OF THE INVENTION

It is, therefore, an object of the present invention to provide a device and method for identifying a PN sequence using on/off keying in an asynchronous CDMA communication system, in order to reduce the time required for a mobile station to search for a base station.

It is another object of the present invention to provide a device and method for identifying a PN sequence using on/off keying in an asynchronous CDMA communication system, in order to reduce interference caused by a forward secondary sync channel.

It is a further object of the present invention to provide a device and method for identifying a PN sequence using on/off keying in an asynchronous CDMA communication system, in order to reduce the complexity of a mobile station.

To achieve the above objects, there is provided a PN sequence identifying device in a receiver in an asynchronous CDMA communication system, which receives first OGCs on a primary sync channel and second OGCs on a secondary sync channel synchronized with the primary sync channel symbol by symbol. In the PN sequence identifying device, a first OGC detector detects the first OGCs and obtains a first symbol energy. A first synchronizer receives the first symbol energy, synchronizes chips, symbols, and slots, and outputs a first sync signal. Upon reception of the first sync signal, the second OGC detector detects each time a first sync signal is received, and obtains second symbol energies in base station identifying group units. A hopping pattern generator compares the first symbol energy with the second symbol energies, determines whether null signs are in the second OGCs, determines the order of the null signs if the null signs are present, and generates a hopping pattern of the second OGCs. A second synchronizer synchronizes frames based on the hopping pattern and outputs a second sync signal. A PN sequence generator receives the first and second signals and the hopping pattern and generates a PN sequence.

BRIEF DESCRIPTION OF THE DRAWINGS

The above and other objects, features and advantages of the present invention will become more apparent from the following detailed description when taken in conjunction with the accompanying drawings in which:

FIG. 2 illustrates an example of a PN sequence generator in the conventional synchronous CDMA mobile communication system;

FIG. 2C is an OGC hopping pattern table for identifying the group of a PN sequence used by a base station in the asynchronous system;

FIG. 4C is an OGC hopping pattern table for identifying the group of a PN sequence used by a base station in the asynchronous system;

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 4A:
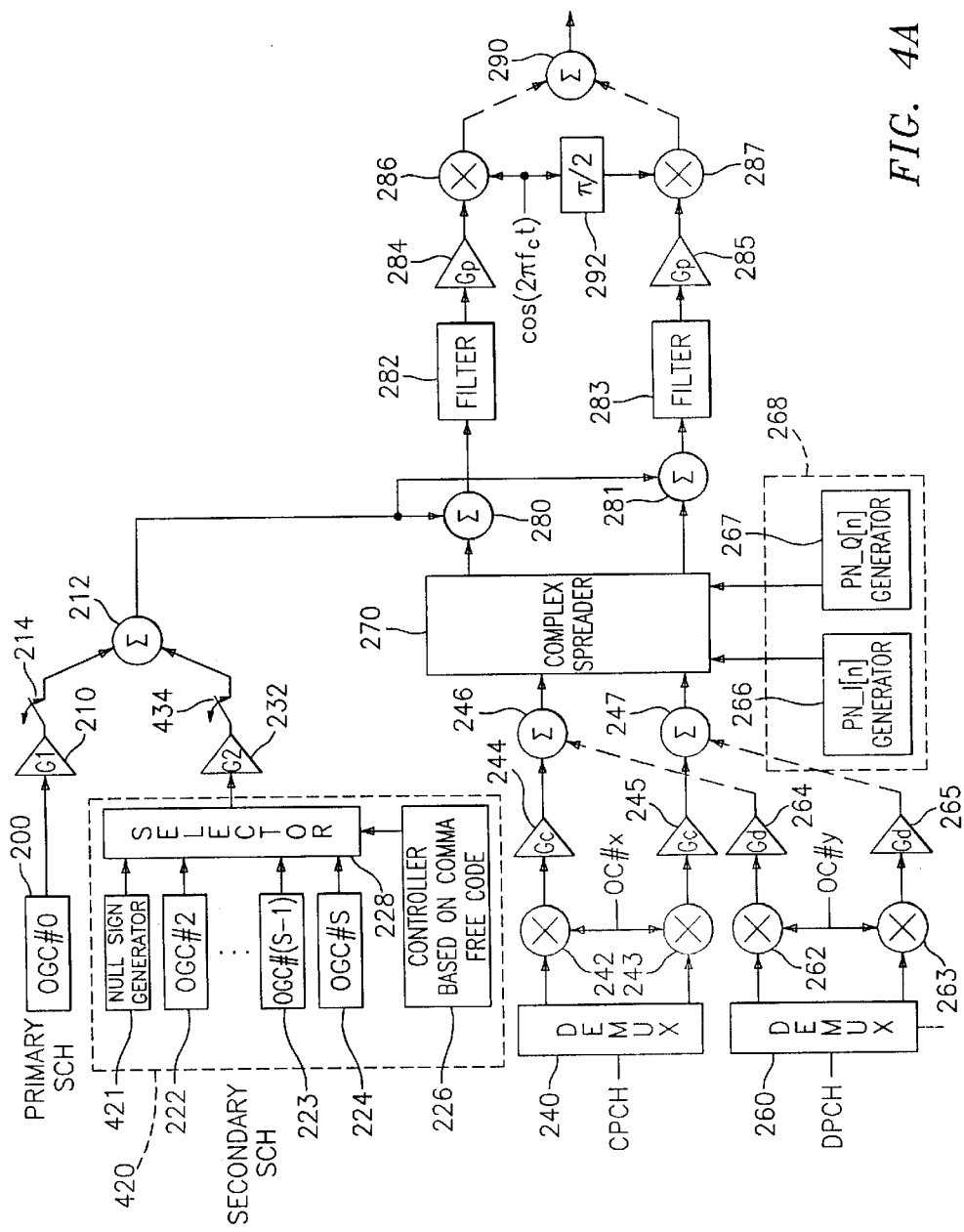
FIG. 4A is a block diagram of a base station transmitter in an asynchronous CDMA mobile communication system according to an embodiment of the present invention.

FIG. 4A is a block diagram of a base station transmitter in a mobile communication system according to an embodiment of the present invention.

The present invention is equivalent to a conventional system in that S orthogonal gold code generators OGCs are used to identify a PN sequence group by utilizing a combination of (S−1) OGCs and on-off keying.

The present invention utilizes a foundation principle whereby an off state (i.e., a null, sign) is orthogonal with any signal used. That is, a PN sequence group is identified by constructing S second orthogonal OGCs using (S−1) OGCs and one null sign, instead of a hopping pattern of S second OGCs. In this case, the null sign is orthogonal to other second OGCs, thereby obtaining the same effect as a conventional hopping pattern.

Figure 4B:
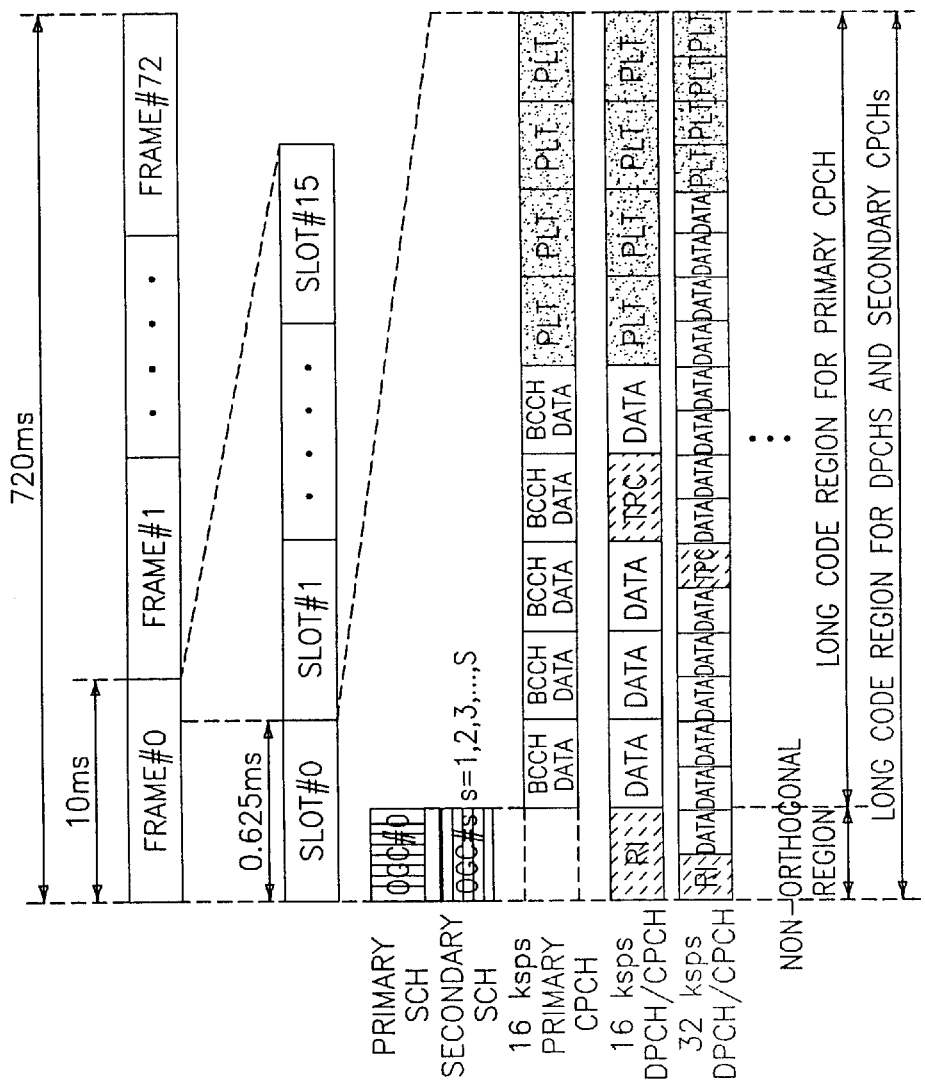
FIG. 4B illustrates the structure of a signal transmitted from a base station in the asynchronous system.
Figure 4C:
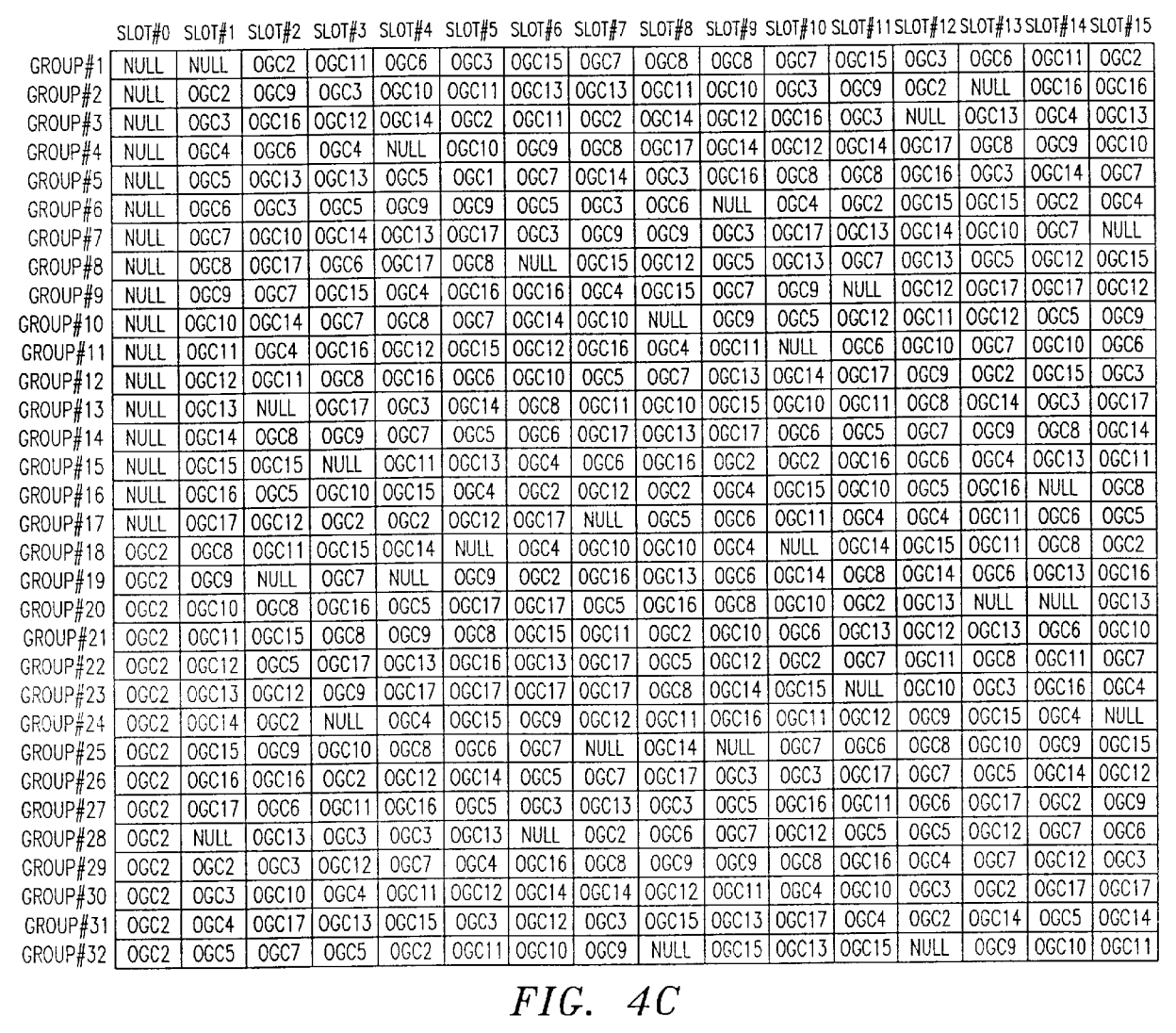

FIG. 4A is a block diagram of the base station transmitter according to the present invention, FIG. 4B illustrates the structure of a base station transmission signal according to the present invention, and FIG. 4C illustrates the case where a null sign substitutes for a second OGC #1.

Figure 1A:
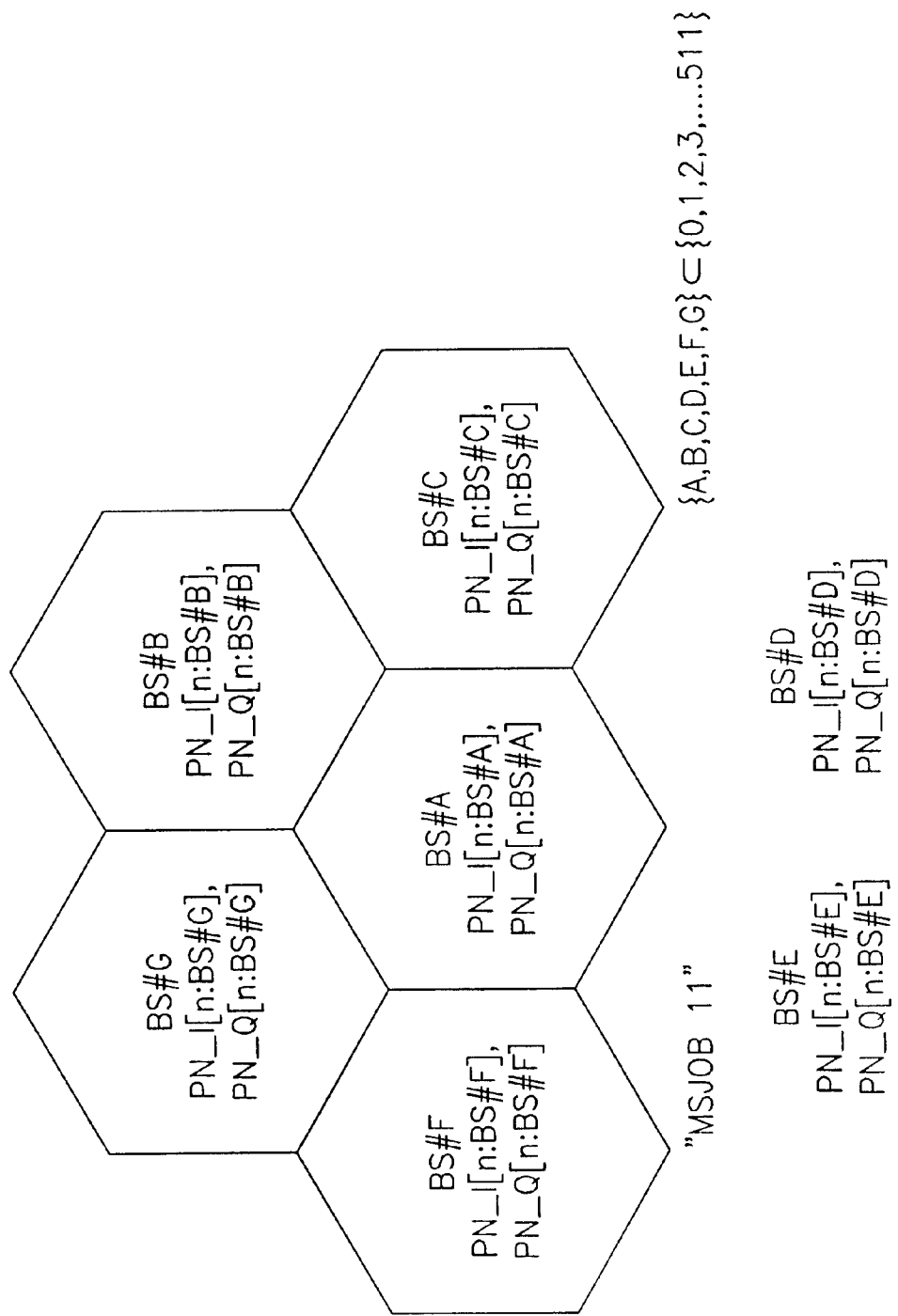
FIG. 1 is a cell layout diagram of a conventional synchronous CDMA mobile communication system.
Figure 1B:
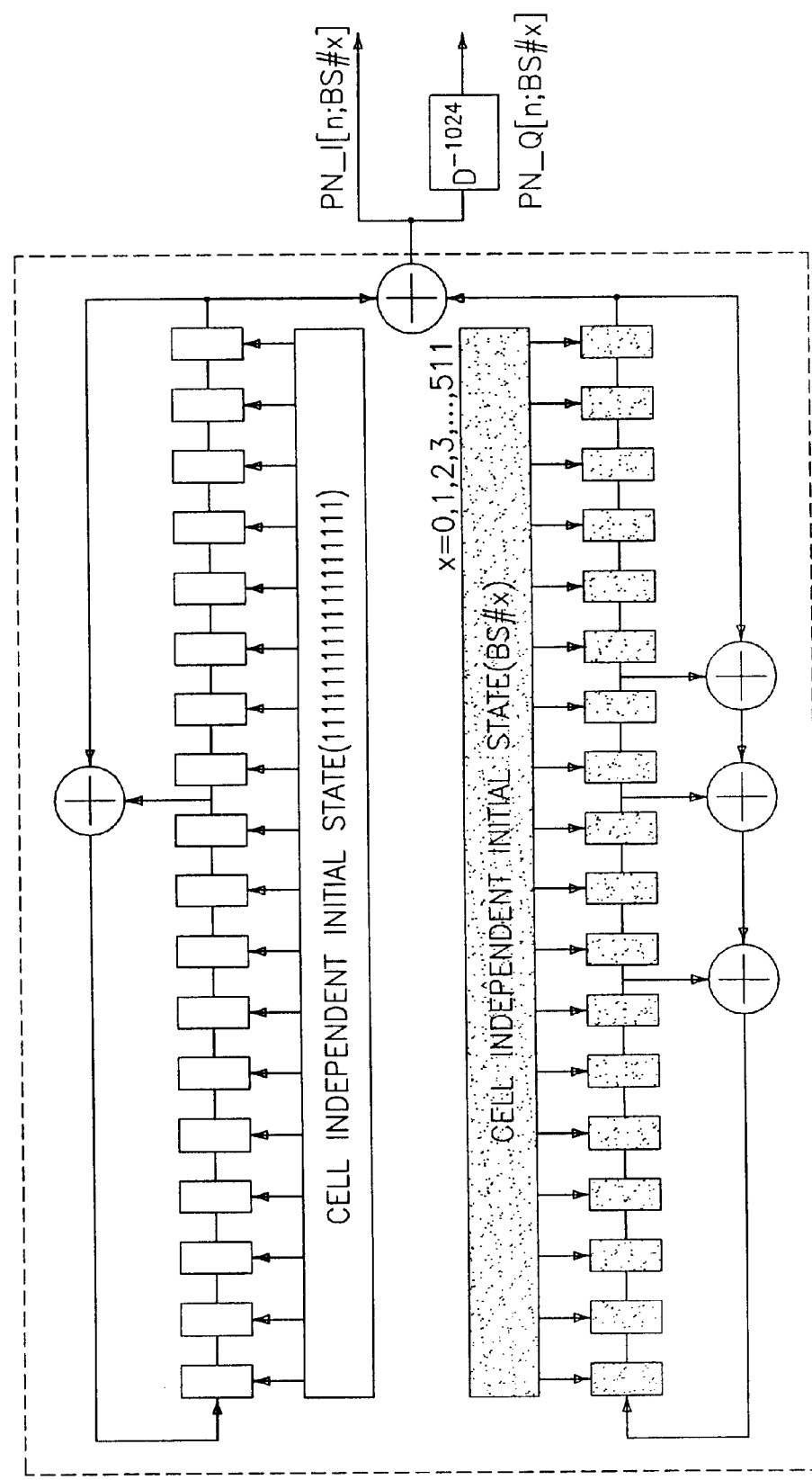
Figure 2A:
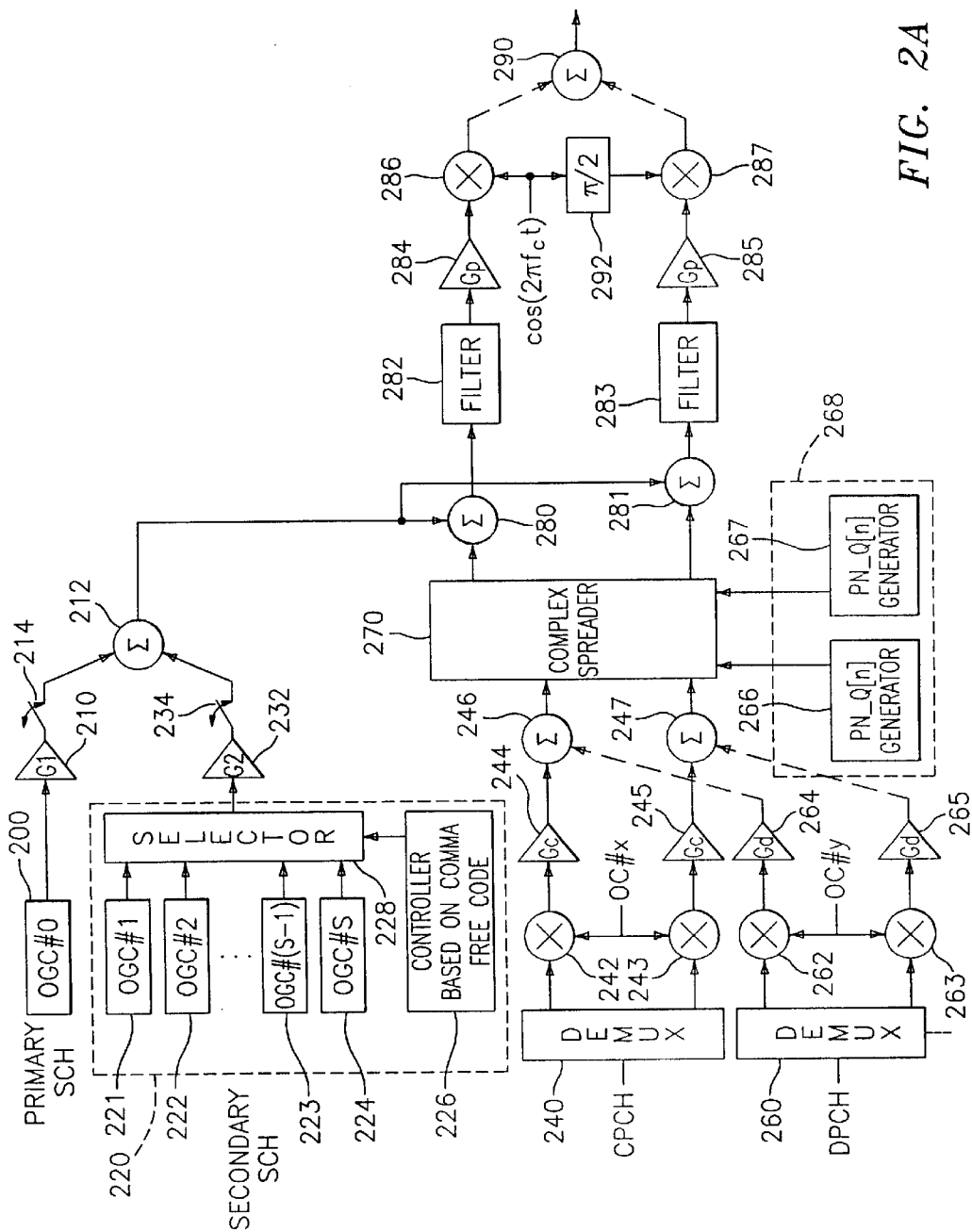
FIG. 2A is a schematic view of a base station transmitter in a typical asynchronous CDMA mobile communication system.

The conventional transmitter of FIG. 2A is the same as the transmitter of the present invention except that the OGC generating unit 420 and the switch 434 is different in both configuration and operation. Thus, a detailed description of the transmitter shown in FIG. 4A is omitted. Only the OGC generating unit 420 constructed in accordance with the present invention will be described below.

In FIG. 4A, a second OGC generating unit 420 generates a secondary sync channel OGC to be transmitted in each slot according to a hopping pattern formed in comma free codes. Here, a null sign is also a secondary sync channel OGC. The OGC generating unit 420 is comprised of (S−1) second OGC generators 222 to 224, a null sign generator 421, and a controller 226. The null sign generator 421 generates a null sign under the control of the controller 226. While the null sign generator 421 is positioned as an OGC #1 generator in FIG. 4A, it can be varied. It should be appreciated that the first OCG #1 is replaced by the null sign. The null sign generator 421 is shown in the drawing to indicate that the secondary sync channel is not transmitted in a null sign assigned slot. Therefore, it may not be an actual transmitter, and the same effects can be obtained by opening a switch 434 in the corresponding slot. While the switches 214 and 434 are operated in the same manner in the prior art, they may be operated differently when a null sign is generated by operating the switch 434.

Figure 2B:
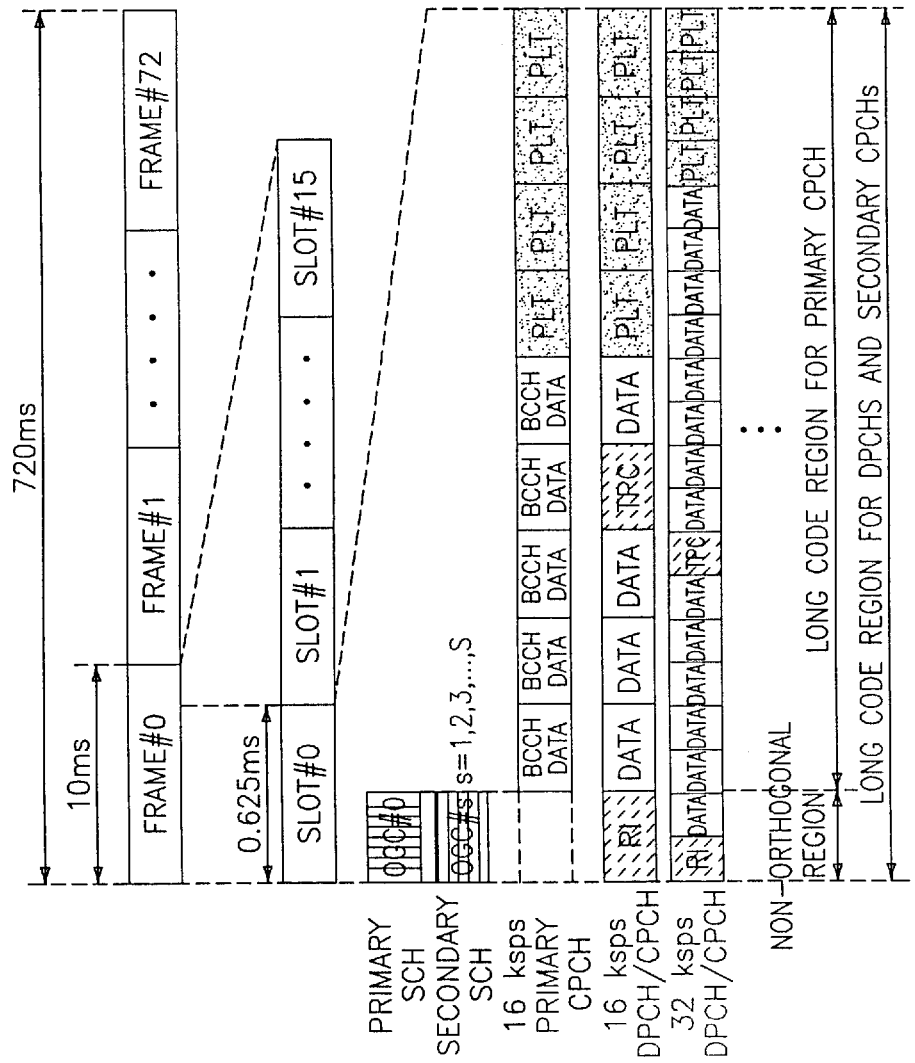
FIG. 2B illustrates the structure of a signal transmitted from a base station in the asynchronous system.

FIG. 4B illustrates the structure of a base station transmission signal according to an embodiment of the present invention. This is also the same as the signal structure shown in FIG. 2B except that the number of OGCs is decreased from S (s=1, 2, 3, ..., S) to (S−1) (s=2, 3, ..., S) due to use of a null sign.

Figure 2C:
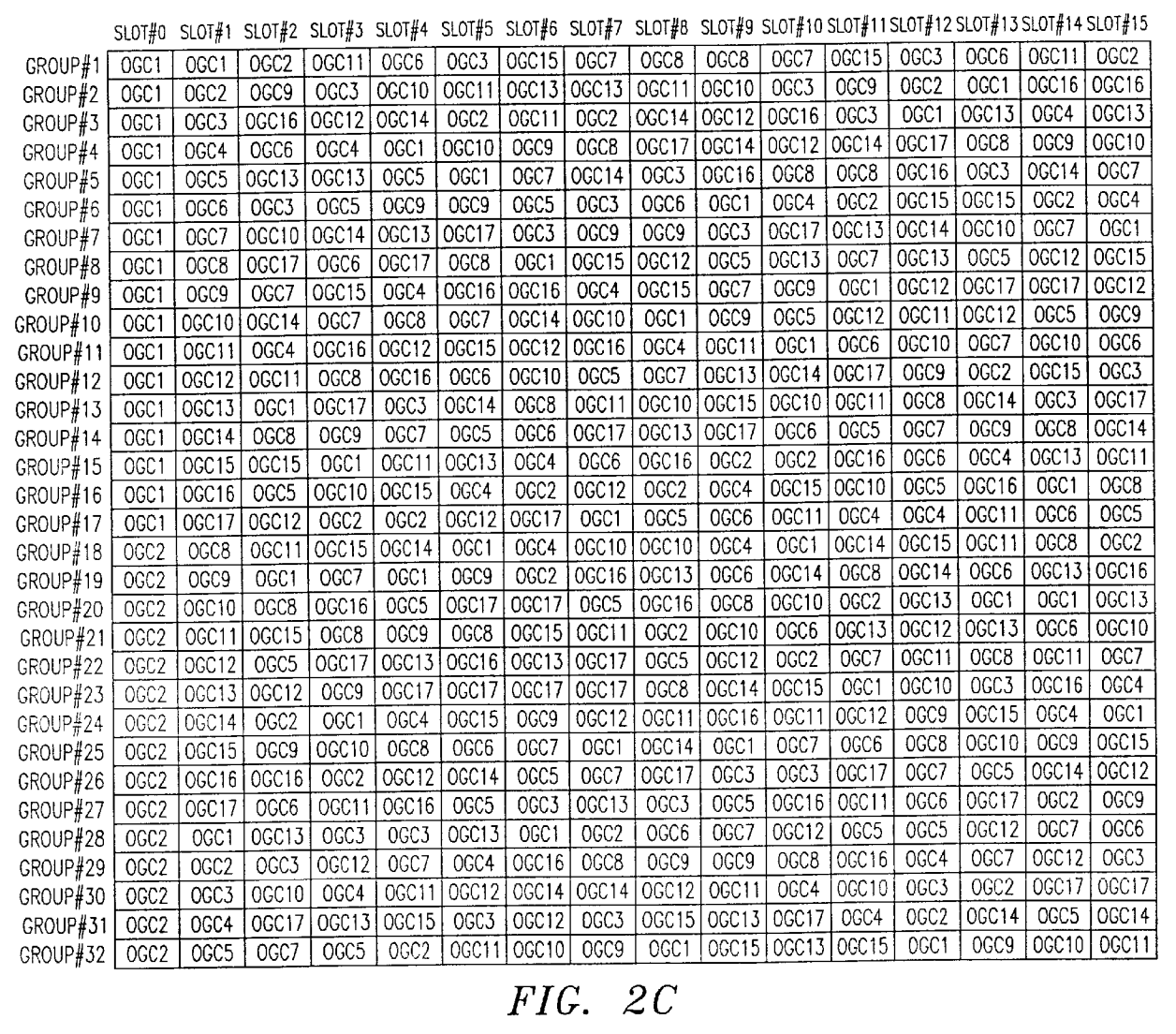

FIG. 4C illustrates OGCs in the slots of a frame transmitted on a secondary sync channel. Here, S=17 and the number of PN sequence groups to be identified is 32. Referring to FIG. 4C, the OGC #1 of FIG. 2C is replaced with a null sign. A null sign replacement occur 45 times in total in FIG. 4C. As the number of null signs increases, the total interference on a forward link caused by the secondary sync channel in the system is further reduced. Therefore, an OGC most frequently shown in FIG. 2C is replaced with a null sign. Assuming that the transmission powers of the primary and secondary sync channels are the same as those of FIG. 2C, the average interference caused by the secondary sync channel is reduced by about 8% (=45/(32×16)= 0.08789).

Figure 5A:
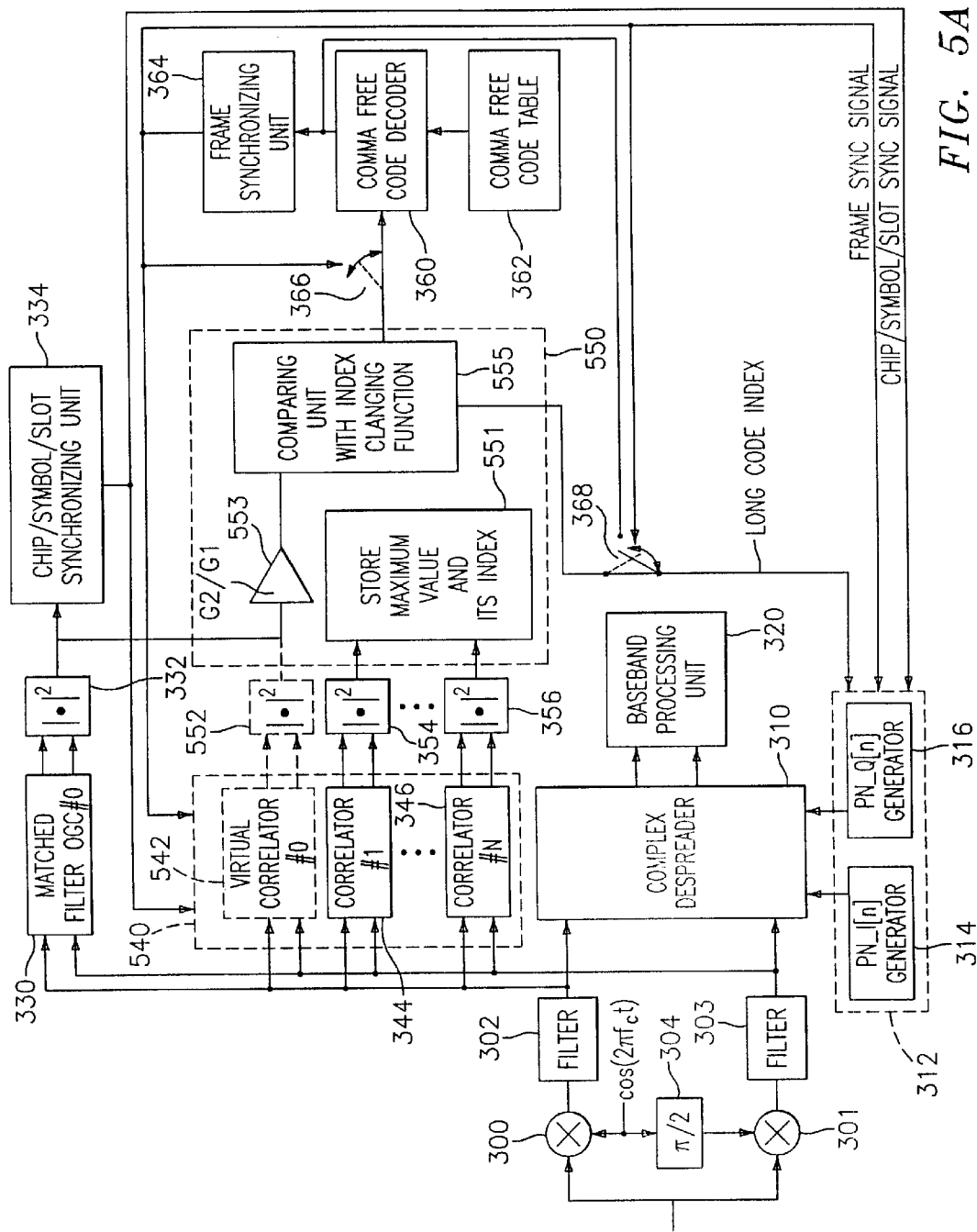
FIG. 5A is a block diagram of a mobile station receiver in the asynchronous CDMA mobile communication system according to an embodiment of the present invention.
Figure 5B:
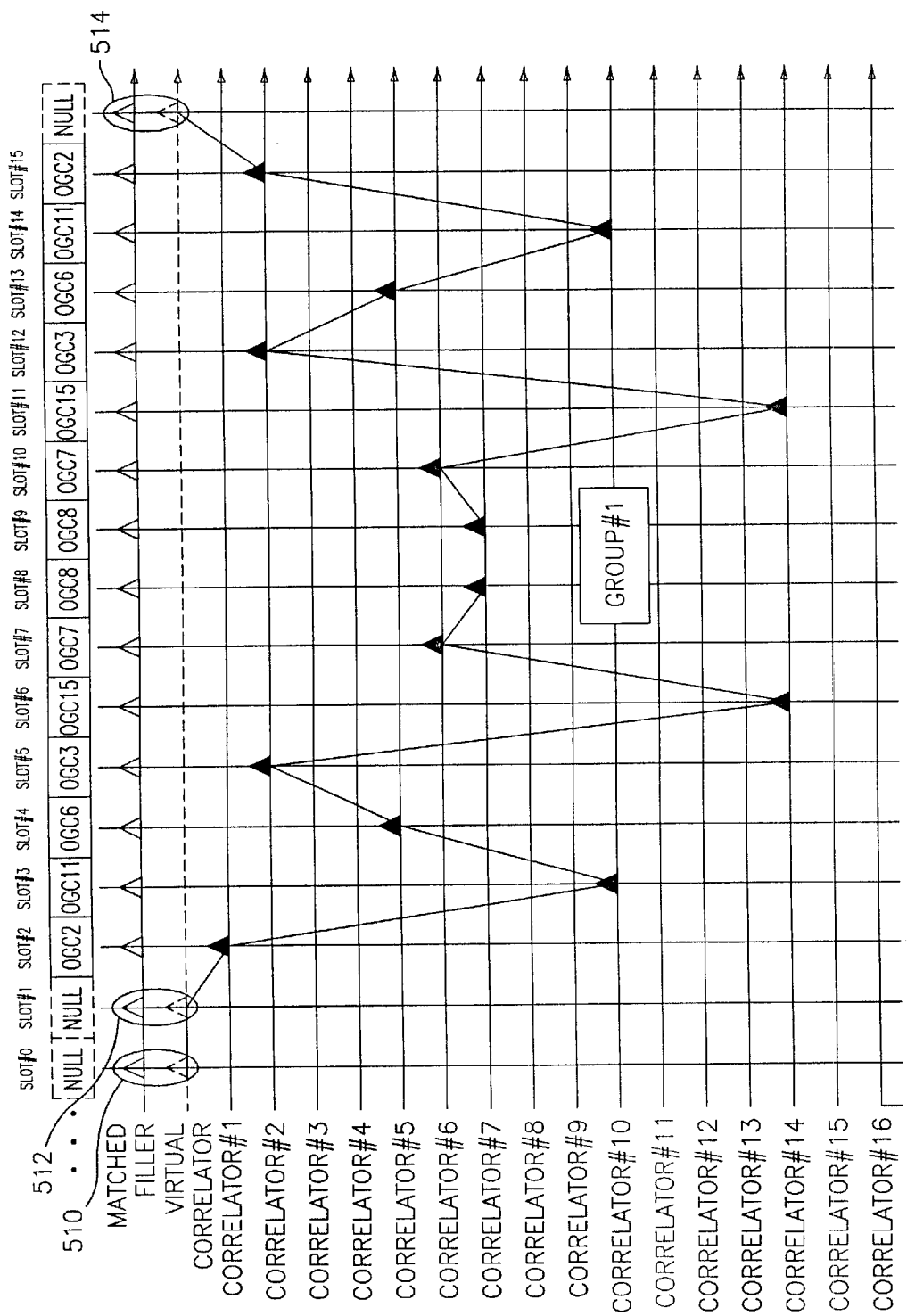
FIG. 5B illustrates an example of a signal received in a mobile station in the asynchronous system.
Figure 5C:
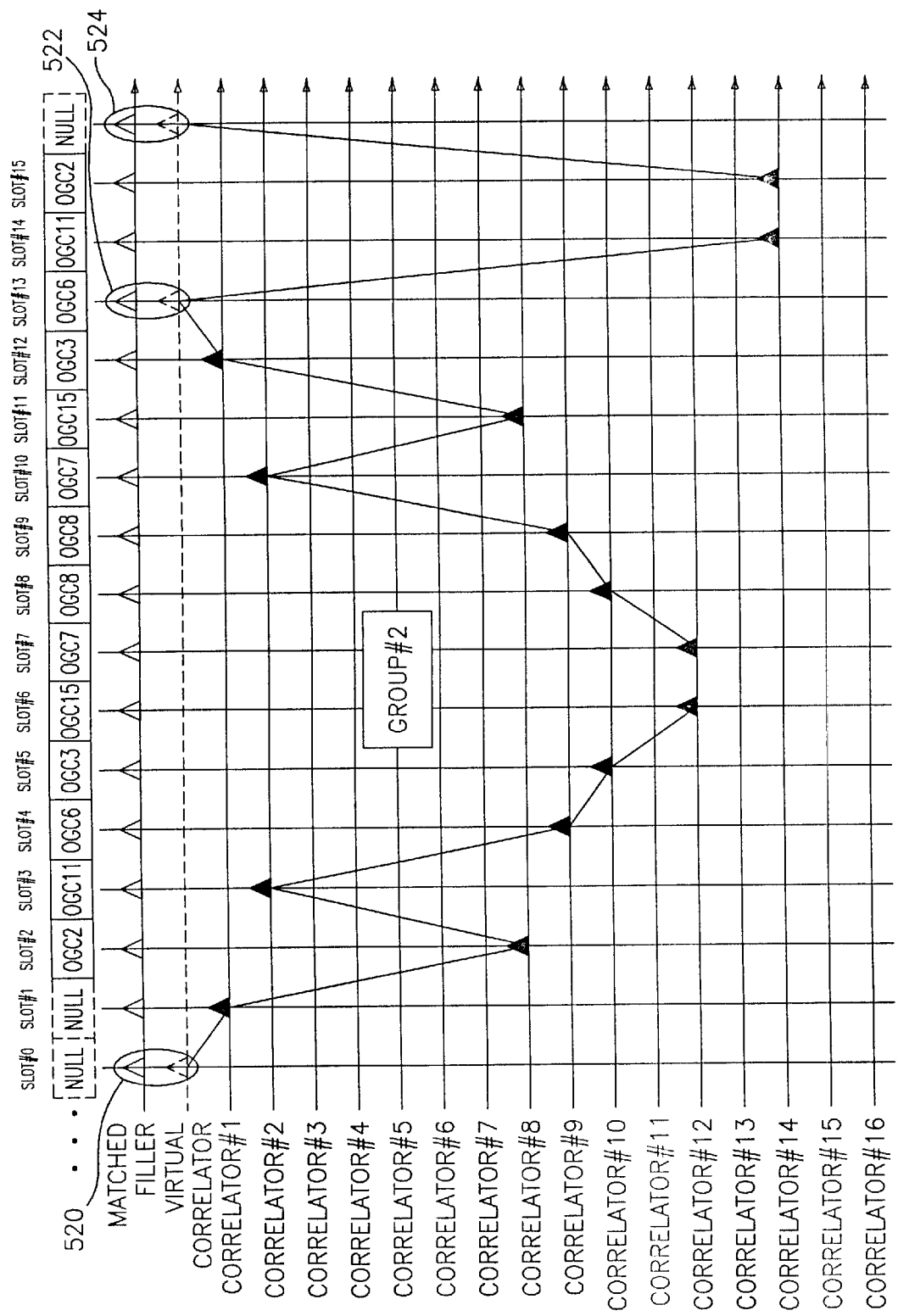
FIG. 5C illustrates a second example of a signal received in a mobile station in the asynchronous system.
Figure 5D:
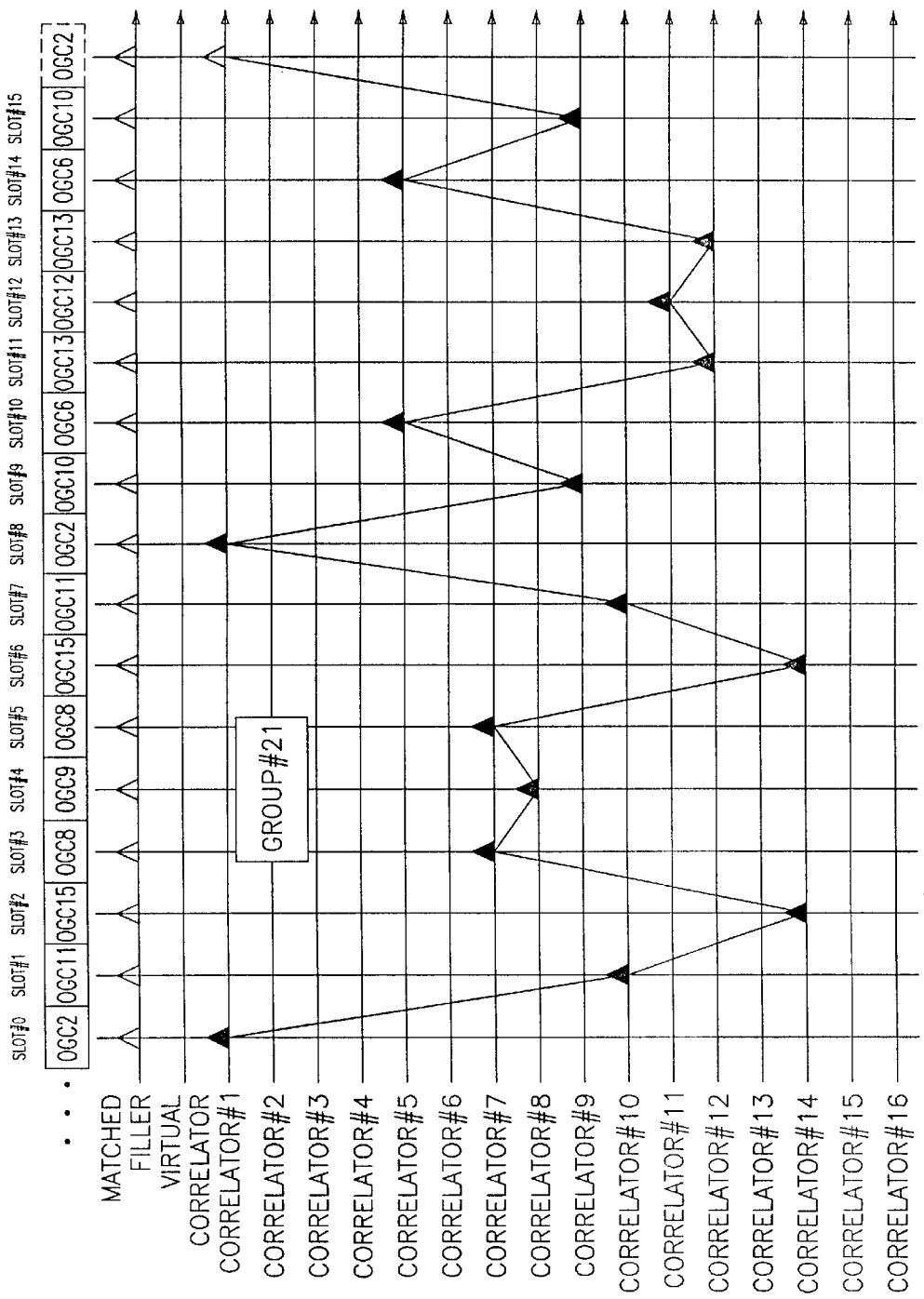
FIG. 5D illustrates a third example of a signal received in a mobile station in the asynchronous system.

FIG. 5A is a block diagram of a mobile station receiver according to an embodiment of the present invention, and FIGS. 5B, 5C, and 5D illustrate examples of received signals with respect to PN sequence groups #1, #2, and #21 shown in FIG. 4C.

The mobile station receiver of FIG. 5A can be used as a counterpart to the base station of FIG. 2A as well as the base station transmitter of FIG. 4A. This is possible because even if a base station transmits the OGC #1, the receiver of the present invention neglects the signal, that is, a correlator is not assigned for the OGC #1.

A 90° phase shifter 304 outputs a carrier $\sin(2\pi f_c t)$ by shifting the phase of a received carrier $\cos(2\pi f_c t)$ by 90°. An input signal is separated into an I signal and a Q signal by a demultiplexer (not shown). A mixer 300 multiplies the I signal by the carrier $\cos(2\pi f_c t)$ and outputs an I baseband signal. A mixer 301 multiplies the Q signal by the carrier $\sin(2\pi f_c t)$ and outputs a Q baseband signal. Filters 302 and 303 filter only a signal of a necessary baseband from the outputs of the mixers 300 and 301 and detect a first OGC. A squarer 332 squares the output of a matched filter 330 and outputs the symbol energy of the first OGC being a primary sync channel. The symbol energy is applied to the inputs of a chip/symbol/slot synchronizer 334 and a hopping pattern detector 550.

A correlation detecting unit 540 detects correlation values of received second OGCs from the outputs of the filters 302 and 303. The correlation detecting unit 540 includes a virtual correlator 542 and N correlators. The virtual correlator 542 does not actually exist. The output of the virtual correlator 542 is applied to the input of a virtual squarer 552. The outputs of the N correlators 344 and 346 are applied to their respective corresponding squarers 354 and 356. The virtual squarer 552 does not exist either. The virtual correlator 542 for detecting the null sign is marked with a dotted line for help in describing this invention. The presence/absence and sequence of null signs are determined by the matched filter 330, the squarer 332, and the index generator 550, which will be described later. The squarers 354 and 356 produces symbol energies by squaring input signals.

An index generator 550 receives the symbol energies from the squarers 354 to 356 and the symbol energy of the first OGC from the squarer 332 instead of the output of the virtual squarer 552, and outputs long code indexes in the order of higher symbol energies. The index generator 550 includes a maximum value detector 551, an amplifier 553, and a comparator 555. The maximum value detector 551 detects the highest of the symbol energies received from the squarers 354 to 356 and stores the number of correlators in the order of higher symbol energies. The amplifier 553 amplifies the symbol energy received from the squarer 332. The comparator 555 compares the symbol energy received from the amplifier 553 with the symbol energy received from the maximum value detector 551 and considers that a null sign has been generated if the former is larger than the latter.

Figure 3A:
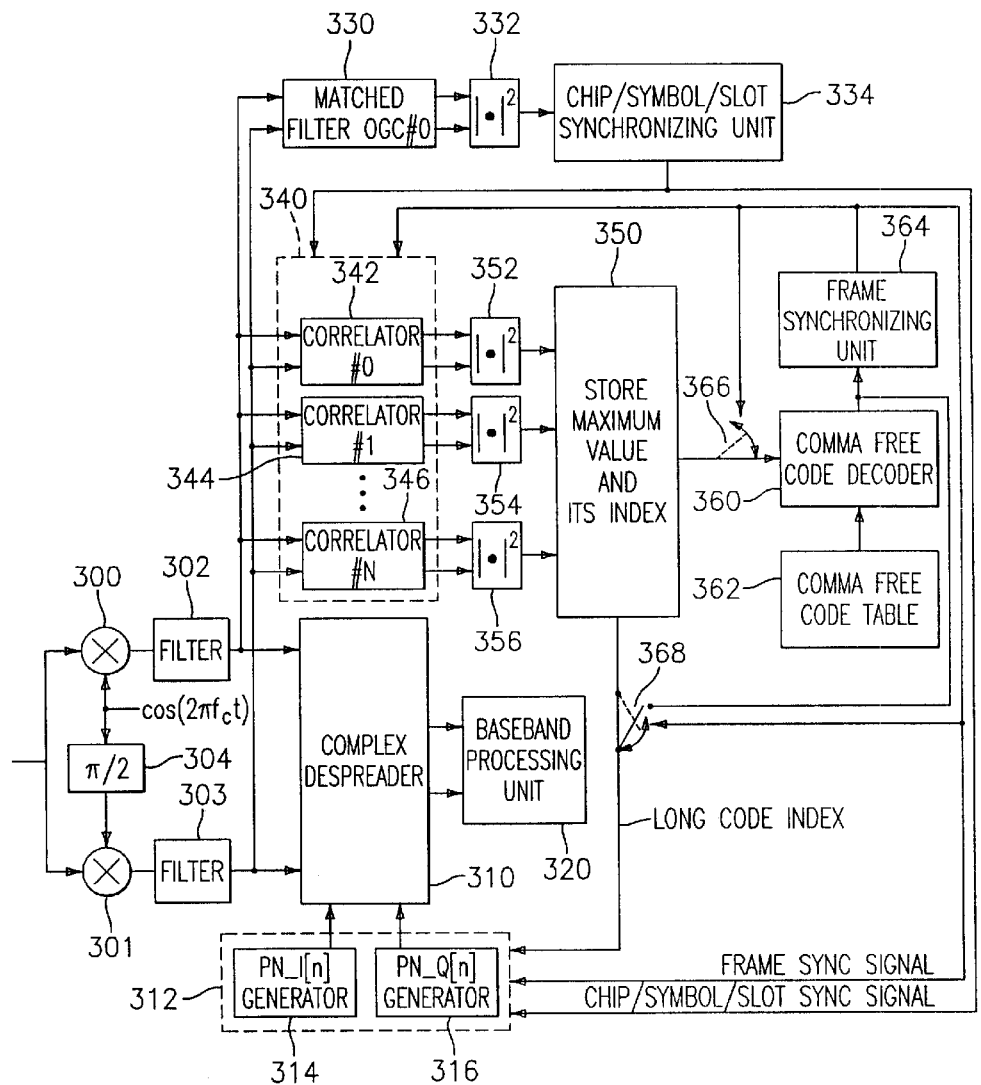
FIG. 3A is a block diagram of a mobile station receiver in the typical asynchronous CDMA mobile communication system.
Figure 3B:
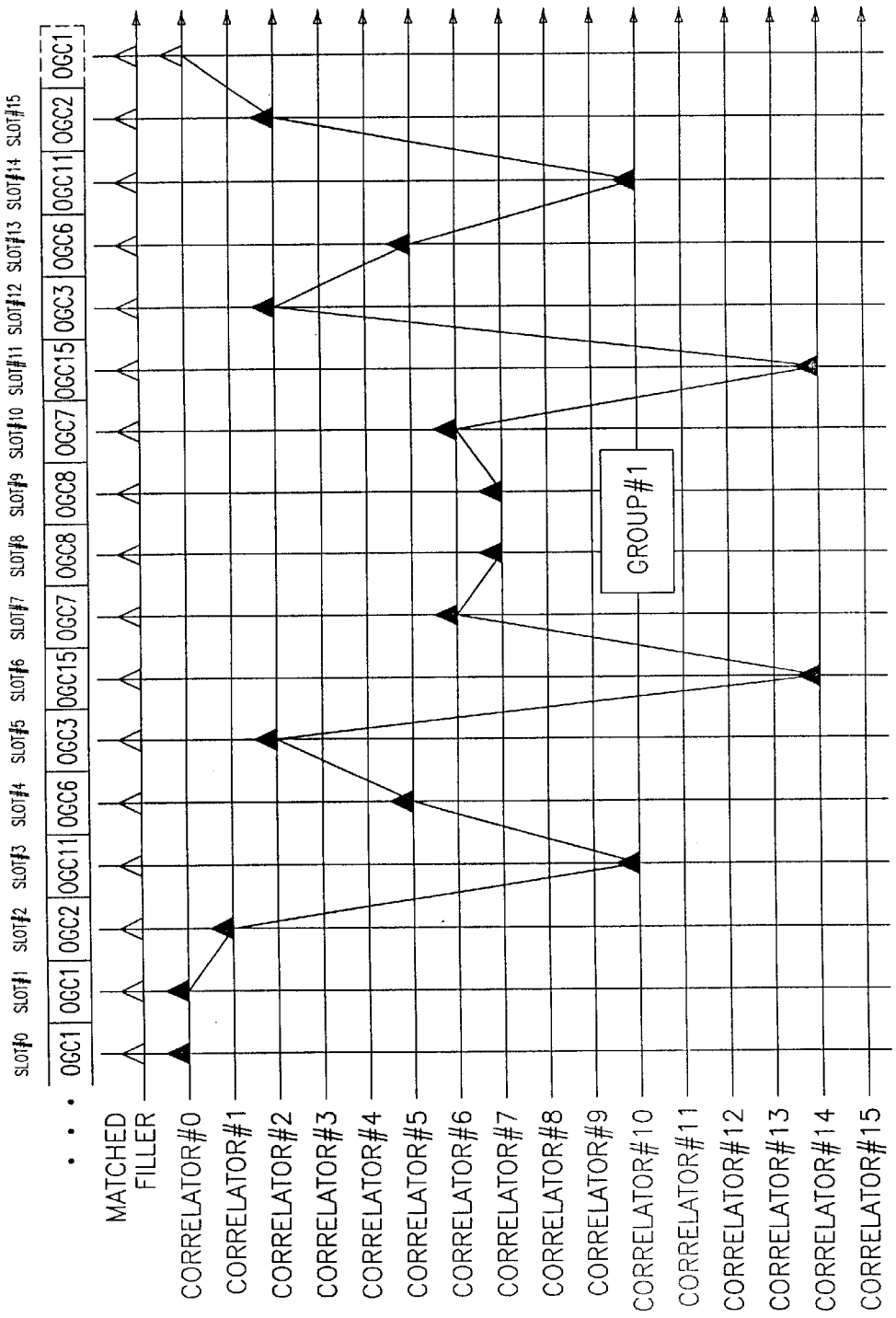
FIG. 3B illustrates an example of a signal received in a mobile station in the asynchronous system.
Figure 3C:
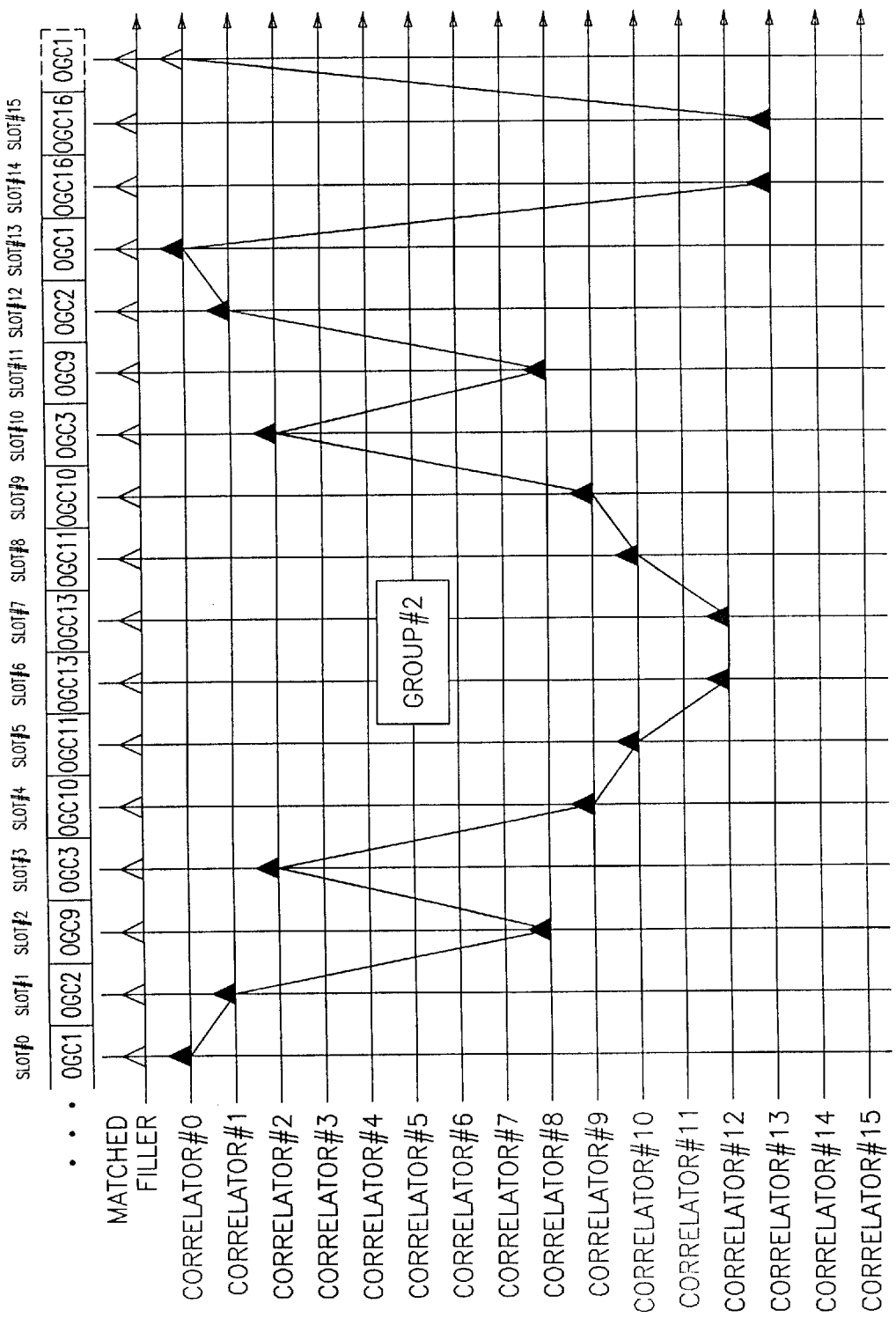
FIG. 3C illustrates another example of a signal received in a mobile station in the asynchronous system.
Figure 3D:
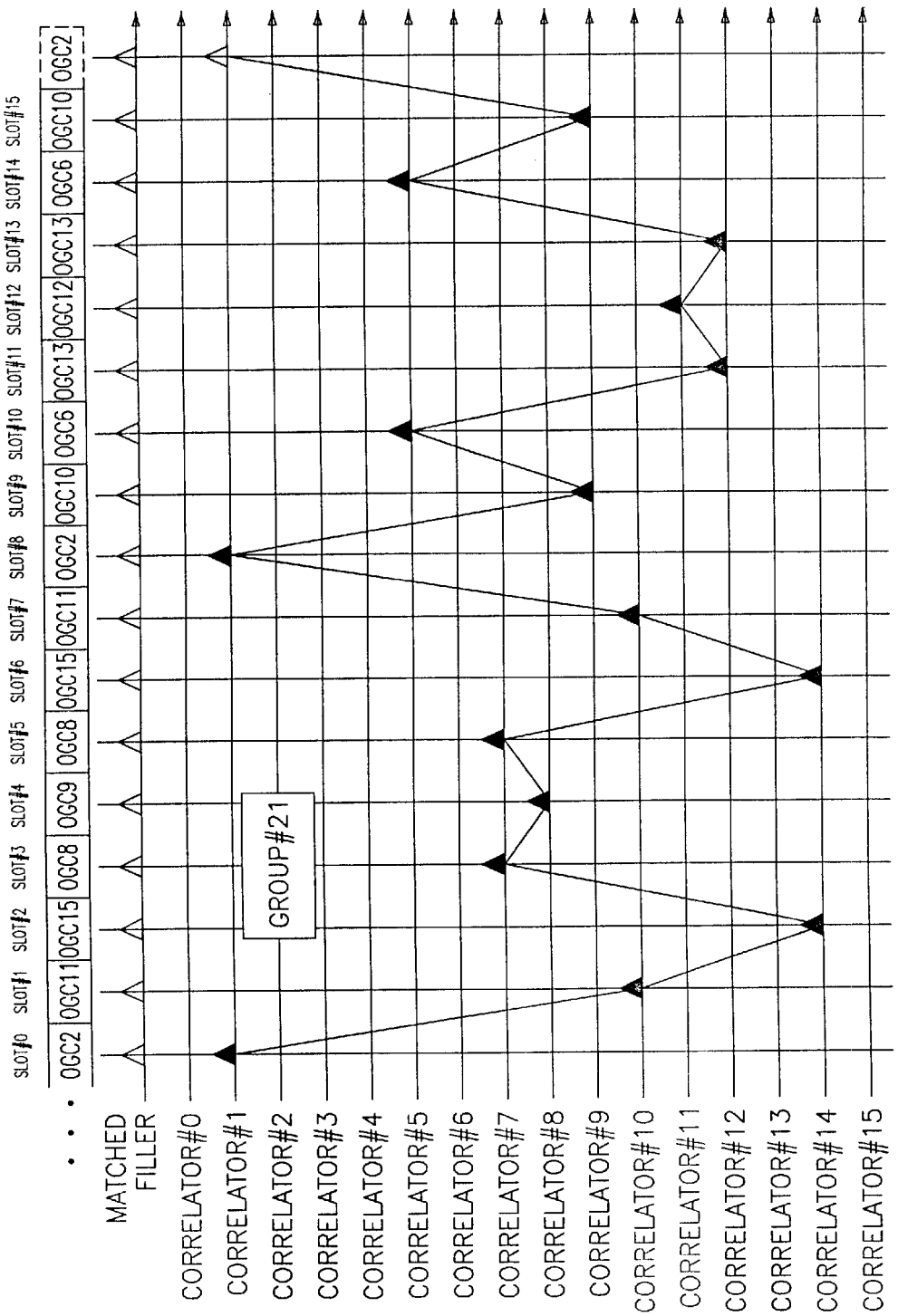
FIG. 3D illustrates a third example of a signal received in a mobile station in the asynchronous system.

More specifically, the index generator 550 receives the symbol energy from the squarer 332. The amplifier 553 amplifies the symbol energy by the reciprocal of the ratio of the transmission power of the primary sync channel to that of the secondary sync channel and the amplified signal is applied to the comparator 555. The input signal corresponds to the corresponding correlator #0 342 of FIG. 3A but is considered to be the output of the virtual correlator 552 which does not actually exist. Since the virtual correlator 542 and its corresponding squarer 552 are not present actually, they are marked by a dotted line. If N=(S−1), N correlators operate under the control of the chip/symbol/slot synchronizer 334 as compared to the prior art in which S=(N+1) correlators operate. If S=17, N=16 and the number of PN sequences in each PN sequence group is also N=16. Here, the total number of PN sequences is 512 (=32×16). Therefore, frame synchronization is acquired and then a PN sequence is identified by correlation. The outputs of the filters 302 and 303 are applied to the corresponding correlators of the correlation detecting unit 340. If S=17 and N=16, the correlator #1 344 obtains a correlation value between the received signal and the second OGC #2, and the correlator #N 346 obtains a correlation value between the received signal and the 17th OGC #17. The squarers 354 and 356 calculate the symbol energies of the outputs of the correlators 344 and 346. The index generator 550 stores the highest of the symbol energies received from the squarers 332, 354, and 356 and stores the number of the correlator whose output has the highest symbol energy. The index generator 550 is the same as the maximum value detector 350 of FIG. 3A in operation, except that the number of inputs is less than those of the maximum value detector 350 by one due to use of the null sign. The comparator 555 compares the symbol energy received from the squarer 332 through the amplifier 553 and the symbol energy received from the maximum value detector 551. If the former is larger than the latter, the comparator 555 considers that a null sign has been received and changes the size of the signal applied to the comma free code decoder 360 and an orthogonal code index. On the other hand, if the latter is larger than the former, the comparator 555 changes no signal size and orthogonal code index. For example, if the comparison is performed sequentially according to the numbers of correlators and the symbol energy output from the squarer 332 is larger than that of the correlator #4, the orthogonal code number of a null sign is #4 and the predetermined numbers after the correlator #4 are sequentially incremented by 1.

The chip/symbol/slot synchronizer 334 determines whether the primary sync channel is present in each slot of the output of the squarer 332. The chip/symbol/slot synchronizer 334 synchronizes slots using the first OGC in the presence of the primary sync channel, that is, the first OGC. Since the primary sync channel is only in one symbol period in the case of a symbol rate of 16 ksps, symbols are synchronized using this fact. Further, the chip/symbol/slot synchronizer 334 acquires rough chip synchronization because the first OGC #0 has a peak value in the matched filter.

The subsequent procedural steps are performed in the same manner as in the prior art. The comma free code decoder 360 decodes using the comma free code table 362 and determines a hopping pattern of the highest probability. Once the hopping pattern has been determined, the frame synchronizer 364 synchronizes frames and determines which slot is the first one among the slots determined by the chip/symbol/slot synchronizer 334. The frame synchronizer 364 causes the correlation detector 540 to stop the operation of obtaining a correlation value between an OGC and a received signal for identification of an OGC hopping pattern and causes the first switch 366 to be opened, and then obtains a correlation value for a PN sequence in the group identified based on the hopping pattern, in parallel or in series. If N=16, the frame synchronizer 364 obtains correlation values of 16 candidate PN sequences using 16 correlators among the 17 correlators. The index generator 550 identifies a PN sequence used in a corresponding base station at one time based on the size of the correlation values if a verification procedure is not performed. The long code index applied to the input of the PN sequence generator 312 is produced by switching the identified PN sequence from the second switch 368 to the comma free code decoder 360. In the above procedure, the PN sequence generator 312 operates upon reception of the chip/symbol/slot sync signal and the frame sync signal, and generates a PN code by the long code index. The PN sequence generator 312 includes the PN_I generator 314 and the PN_Q generator 316. The complex despreader 310 complex-multiplies the signals received from the filters 302 and 303 by the PN code received from the PN sequence generator 312, for complex despreading. The despread signal is applied to a baseband processor 320. The baseband processor 320 recovers data transmitted from the base station by deinterleaving and channel-decoding the output of the complex despreader 310.

FIGS. 5B, 5C, and 5D illustrate desired hopping patterns, each including null signs, received in a mobile station receiver, generated by comma free codes, for use in identifying the PN sequence groups #1, #2, and #21 of FIG. 4C. The virtual correlator is not marked by a solid line because it does not exist actually. As indicated by 510, 512, and 514 in FIG. 5B, the output of a matched filter has a periodic peak value while it is operated, and it is determined whether there is a null sign using the output value of the matched filter. The same description is applicable to FIGS. 5C and 5D.

The hopping pattern table of FIG. 4C is produced by replacing the OGCs #1 with null signs in the hopping pattern table of FIG. 2C. Thus, the interference caused by OGC #1 encountered in the prior art can be removed and a mobile station determines the presence and absence of a null sign using the outputs of (S−1) correlators and the output of the matched filter used in receiving the primary sync channel, instead of the S=(N+1) correlators. That is, since the outputs of the (S−1) correlators in a null sign-including slot are low in level but the output of the matched filter in the slot is high, it can be determined that the OGC for the secondary sync channel in the slot is a null sign. Though errors may occur under some channel situations, the errors can be reduced using the conventional comma free code decoder. The strength of a signal input to the comma free code decoder is induced from the strength of the primary sync channel in the null sign-including slot. That is, the ratio of the transmission power of the primary sync channel to that of the secondary sync channel is given as a system parameter. Therefore, the mobile station can detect the strength of the secondary sync channel from that of the primary sync channel if not a null sign but rather an OGC #1 is received. The detected value is applied to the comma free code decoder, for decoding.

In accordance with the present invention, replacement of one of second OGCs with a null sign reduces interference caused by the secondary sync channel without changing search characteristics, and reduces the number of correlators, thus reducing mobile power consumption and complexity.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. In an asynchronous CDMA communication system, which transmits and receives first orthogonal Gold codes (OGCs) on a primary sync channel and second OGCs on a secondary sync channel synchronized with the primary sync channel symbol by symbol, comprising:

a transmitter, comprising:
   a PN sequence generating device for generating a PN sequence having one of the OGCs replaced with a null sign; and a receiver, comprising:
   a first OGC detector for detecting the first OGCs and obtaining a first symbol energy;
   a first synchronizer for receiving the first symbol energy, synchronizing chips, symbols, and slots, and outputting a first sync signal;
   a second OGC detector, upon reception of the first sync signal, detects the second OGCs each time the first sync signal is received, and obtaining second symbol energies in base station identifying group units;
   a hopping pattern generator for comparing the first symbol energy with the second symbol energies, determining whether null signs are in the second OGCs, determining the order of the null signs if the null signs are present, and generating a hopping pattern of the second OGCs;
   a second synchronizer for synchronizing frames based on the hopping pattern and outputting a second sync signal; and
   a PN sequence generator for receiving the first and second signals and the hopping pattern and generating a PN sequence.

2. The device of claim 1, wherein the first OGC detector comprises:
   a matched filter for detecting the first OGCs received on the primary sync channel; and
   a first squarer for calculating the symbol energy of the first OGCs.

3. The device of claim 1, wherein the second OGC detector comprises:
   a plurality of correlators for detecting second OGCs except for the null signs among the second OGCs received on the secondary sync channel; and
   a plurality of second squarers for calculating the symbol energies of the second OGCs received from the correlators.

4. The device of claim 1, wherein the hopping pattern generator comprises:
   a hopping pattern estimator for determining whether null signs exist, comparing the first symbol energy with each of the second symbol energies if the null signs are present, determining the order of the null signs, and estimating a hopping pattern of the second OGCs; and
   a hopping pattern determiner for storing a comma free code table, comparing the estimated hopping pattern with the comma free code table, and determining a hopping pattern.

5. The device of claim 4, wherein the hopping pattern estimator comprises:
   a maximum value detector for detecting the highest of the second symbol energies, and sequentially storing the highest symbol energy and the number of the correlator with the highest symbol energy;

an amplifier for amplifying the first symbol energy by the reciprocal of the ratio of the transmission power of the first symbol energy to that of the stored second symbol energy; and a comparator for determining the presence and order of null signs by comparing the amplified first symbol energy with the stored second symbol energy, and generating an estimated hopping pattern.

6. The device of claim 4, wherein the hopping pattern determiner comprises:

a comma free code table for storing comma free codes; and a hopping pattern determiner for receiving the estimated hopping pattern, comparing the estimated hopping pattern with the comma free code table, determining a hopping pattern, and outputting the hopping pattern to the second synchronizer and the PN sequence generator.

7. The device of claim 5, wherein the hopping pattern determiner comprises:

a comma free code table for storing comma free codes; and a hopping pattern determiner for receiving the estimated hopping pattern, comparing the estimated hopping pattern with the comma free code table, determining a hopping pattern, and outputting the hopping pattern to the second synchronizer and the PN sequence generator.

8. The device of claim 5, wherein the comparator compares the first symbol energy with each of the second symbol energies in the detected order and inserts the second symbol energy smaller than the first symbol energy before the number of the correlator which outputs the second symbol energy.

9. The device of claim 6, further comprising a first switch for blocking information applied from the hopping pattern estimator to the hopping pattern determiner upon generation of the second sync signal.

10. The device of claim 7, further comprising a first switch for blocking information applied from the hopping pattern estimator to the hopping pattern determiner upon generation of the second sync signal.

* * * * *